United States Patent
Takabayashi

(10) Patent No.: US 9,007,602 B2
(45) Date of Patent: Apr. 14, 2015

(54) THREE-DIMENSIONAL MEASUREMENT APPARATUS, THREE-DIMENSIONAL MEASUREMENT METHOD, AND COMPUTER-READABLE MEDIUM STORING CONTROL PROGRAM

(75) Inventor: Shiki Takabayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 571 days.

(21) Appl. No.: 13/249,545

(22) Filed: Sep. 30, 2011

(65) Prior Publication Data

US 2012/0089364 A1    Apr. 12, 2012

(30) Foreign Application Priority Data

Oct. 12, 2010   (JP) ................................. 2010-229531

(51) Int. Cl.
*G01B 11/14*  (2006.01)
*G01B 11/25*  (2006.01)

(52) U.S. Cl.
CPC ............ *G01B 11/25* (2013.01); *G01B 11/2527* (2013.01)

(58) Field of Classification Search
CPC ...... G01B 11/25–11/2545; G06T 2207/10152; G06K 9/3216
See application file for complete search history.

(56) References Cited

U.S. PATENT DOCUMENTS

| | | | | |
|---|---|---|---|---|
| 4,202,612 A | * | 5/1980 | Di Matteo et al. | 356/394 |
| 4,259,589 A | * | 3/1981 | DiMatteo et al. | 356/610 |
| 4,634,279 A | * | 1/1987 | Ross et al. | 356/610 |
| 4,653,104 A | * | 3/1987 | Tamura | 356/610 |
| 6,754,370 B1 | * | 6/2004 | Hall-Holt et al. | 382/107 |
| 7,724,379 B2 | * | 5/2010 | Kawasaki et al. | 356/603 |
| 8,436,890 B2 | * | 5/2013 | Mamiya | 382/154 |
| 2002/0164066 A1 | * | 11/2002 | Matsumoto | 382/154 |
| 2010/0194855 A1 | * | 8/2010 | Mamiya | 348/42 |

FOREIGN PATENT DOCUMENTS

| | | |
|---|---|---|
| JP | 2008-032608 A | 2/2008 |
| JP | 2008-145139 A | 6/2008 |

* cited by examiner

*Primary Examiner* — Kara E Geisel

(74) *Attorney, Agent, or Firm* — Canon USA Inc. IP Division

(57) ABSTRACT

A three-dimensional measurement apparatus includes a projection unit configured to project a plurality of types of stripe pattern light. The projection unit projects stripe pattern light, which can be obtained by shifting stripe pattern light whose reliability calculated by the calculation unit is equal to or greater than a threshold value by a predetermined cycle, on the object.

8 Claims, 11 Drawing Sheets

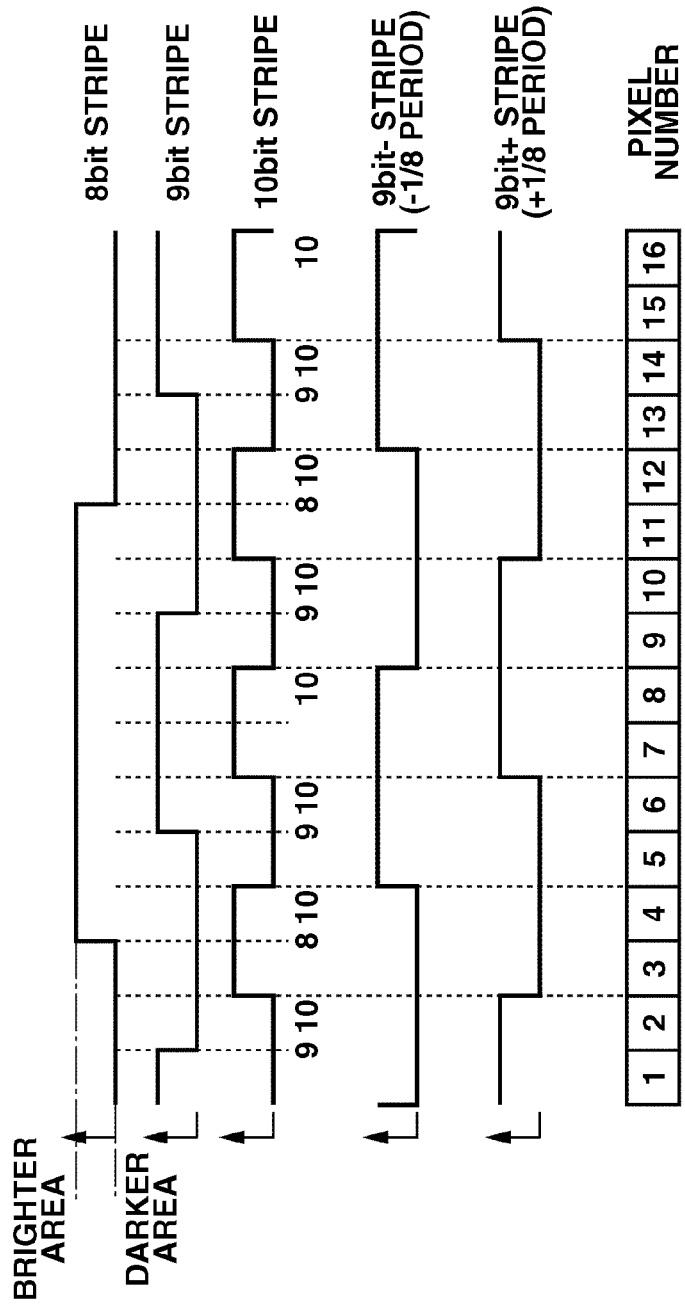

FIG.9A  1bit  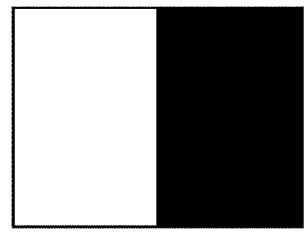
FIG.9B  2bit  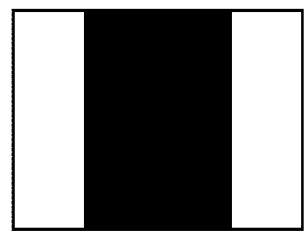
FIG.9C  3bit  
1bit   1 1 1 1 0 0 0 0
2bit   1 1 0 0 0 0 1 1
3bit   1 0 0 1 1 0 0 1

THREE-DIMENSIONAL MEASUREMENT APPARATUS, THREE-DIMENSIONAL MEASUREMENT METHOD, AND COMPUTER-READABLE MEDIUM STORING CONTROL PROGRAM

BACKGROUND OF THE INVENTION

1. Field of the Invention

The present invention relates to a three-dimensional measurement apparatus that is operable according to a spatial coding method, a three-dimensional measurement method, and a computer-readable medium storing a program that can control the apparatus and/or implement the method.

2. Description of the Related Art

Three-dimensional (3D) measurement of shapes has been an important field of research in many fields, such as computer vision for mixed reality (MR) systems, object recognition and image guided surgery (IGS), among others. 3D measurement of shapes includes shape reconstruction techniques, such as stereo vision structured light, and coded light projection, among others. A conventionally known pattern projection method includes projecting a plurality of patterns of light onto an object, capturing an image of the pattern of light projected on the object, and measuring a shape of the object based on a modulation of the pattern using the principle of triangulation. For example, a spatial coding method includes projecting onto an object stripe pattern light, which includes brighter and darker areas alternately disposed at arbitrary intervals, and binary coding a space, which is usable for the three-dimensional measurement of a shape of the object. A product employing the spatial coding method is commercially available. To improve the accuracy in the three-dimensional measurement of shapes according to the spatial coding method, accurately determining a boundary position between neighboring brighter and darker areas of the stripped pattern based on obtained image data is required.

However, in an actual measurement, it is generally difficult to remove adverse influences that may be caused by the reflectance of an object as well as adverse influences by external light (light other than the projected light). As a result, the luminance value does not change steeply in the vicinity of the boundary (see FIG. 10B). In other words, the boundary position cannot be precisely determined. In this case, a captured image includes a gray area at the boundary position between the brighter and darker areas. The gray area remains as a non-separable area.

In this field of endeavor, Japanese Patent Application Laid-Open No. 2008-32608 has proposed a method for accurately determining a boundary position and separating a brighter area and a darker area at the boundary position. For example, if stripe pattern light 110 illustrated in FIG. 11A is projected on an object 111 as illustrated in FIG. 11B, an area 112 in which the brighter area and the darker area are not separated may appear at an upper portion of the object 111 due to various influences, such as the reflectance of the object 111.

FIG. 11C illustrates a pattern when the area 112 is represented by the projected stripe pattern light 110. The method discussed in Japanese Patent Application Laid-Open No. 2008-32608 partly adjusts the quantity of projected light in an area 113 as illustrated in FIG. 11C, and generates partly corrected stripe pattern light as illustrated in FIG. 11D when the stripe pattern light is projected. As described above, neighboring brighter and darker areas can be clearly separated at each boundary position in an image of an object.

A measurement method discussed in Japanese Patent Application Laid-Open No. 2008-145139 includes shifting, by a predetermined cycle, stripe pattern light that has a brighter area and a darker area minimized in width, when a plurality of types of the stripe pattern light is projected. In this manner, the measurement density can be increased.

According to the method discussed in Japanese Patent Application Laid-Open No. 2008-32608, this measuring technique can separate the brighter area and the darker area if the measurement is influenced by the reflectance of an object or external light. However, this measuring technique is not employable in an event that reflected light gets blurred.

Specifically, the influences by the reflectance of an object and external light are dependent on the magnitude in luminance value when the projected light is reflected by an object. Thus, if the light quantity of the projection light is adjusted to minimize reflection, these influences can be reduced. However, the cause of the blur is the diffusion of light on an object surface that becomes larger compared to the in-focus position and the luminance value of the reflected light from the object becomes smaller. Therefore, separation of the boundary position is difficult if the light quantity of the projection light is adjusted to minimize the effects of reflection.

Similarly, the blur of the reflected light is not taken into consideration in the measurement method discussed in Japanese Patent Application Laid-Open No. 2008-145139. Therefore, conventional techniques for measuring 3D shapes are not employable if the stripe pattern light that has a brighter area and a darker area minimized in width cannot be separated at the boundary position due to the influences of blurred reflected light.

SUMMARY OF THE INVENTION

The present invention has been made in consideration of the above situation. One object of the present invention is to provide a spatial coding method capable of appropriately determining a boundary position between a brighter area and a darker area particularly in a case where reflected light gets blurred.

According to the present invention, the foregoing object is attained by providing a three-dimensional measurement apparatus that includes a projection unit configured to project onto an object a plurality of types of stripe pattern light, each stripe pattern being differentiated in width of alternately disposed brighter and darker areas, an imaging unit configured to capture reflected light from the object on which the plurality of types of stripe pattern light is projected by the projection unit, an acquisition unit configured to acquire distance information of the object from a plurality of types of reflected light captured by the imaging unit, which respectively correspond to the plurality of types of stripe pattern light, and a calculation unit configured to calculate reliability of each of the plurality of types of reflected light. The projection unit is configured to project stripe pattern light onto the object; the stripe pattern light can be obtained by shifting stripe pattern light whose reliability calculated by the calculation unit is equal to or greater than a threshold value by a predetermined cycle. The imaging unit is configured to capture reflected light of the stripe pattern light shifted by the predetermined cycle. The acquisition unit is configured to acquire distance information of the object that corresponds to the stripe pattern light shifted by the predetermined cycle.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates boundary positions when stripe pattern light is shifted.

FIGS. 9A to 9C illustrate an example of binary coded stripe pattern light, which is referred to as a gray code.

DESCRIPTION OF THE EMBODIMENTS

Various exemplary embodiments, features, and aspects of the invention will be described in detail below with reference to the drawings.

<First Embodiment>

Hereinafter, a three-dimensional measurement according to a first exemplary embodiment of the present invention is described below with reference to the attached drawings.

First, an example spatial coding method for binary coding a space based on projection using stripe pattern light is described below.

Figure 8:
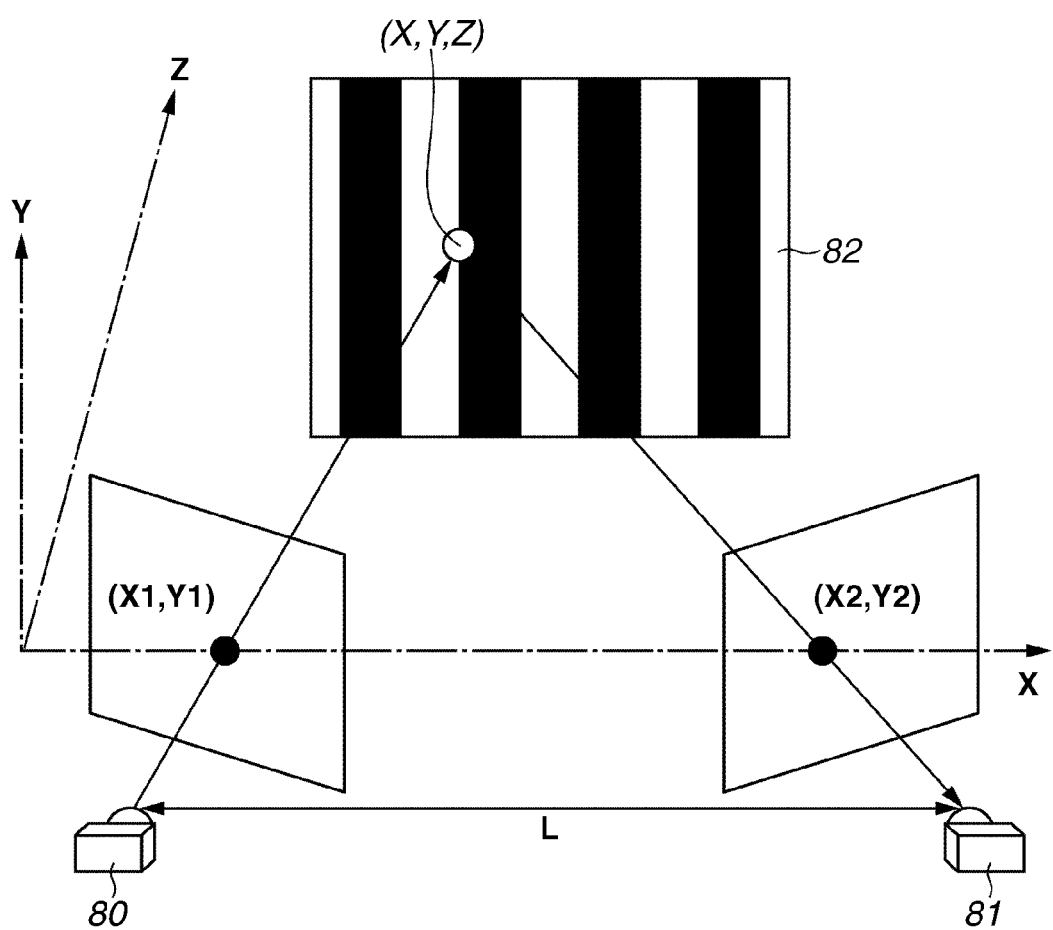
FIG. 8 illustrates an example configuration of a general three-dimensional shape measuring apparatus and the concept of its measurement method.

FIG. 8 illustrates an exemplary configuration of a simplified three-dimensional shape measuring apparatus and the concept of its measurement method.

In its simplest form, the shape measurement apparatus includes a projector 80 that can project pattern light onto an object 82 to be measured, and an image sensor (a camera 81) that can capture an image of a reflected pattern of the projected pattern light. According to the configuration illustrated in FIG. 8, the projector 80 can emit stripe pattern light, which includes brighter and darker areas alternately disposed at arbitrary intervals. The stripe pattern light, emitted by the projector 80, is projected toward the object 82 so that the stripe pattern light is incident upon a surface of the object. The stripe pattern light includes a predetermined plurality of pattern shapes differentiated in widths of brighter and darker areas. When each of these pattern shapes is projected, a reflected pattern of light can be captured by the camera 81 and acquired as image data.

In FIG. 8, the coordinates (X, Y, Z) represent a boundary position between the brighter area and the darker area of the object 82. The coordinates (X1, Y1) represent a principal point position of the projector 80 when the boundary position (X, Y, Z) is connected to the projector 80. Further, the coordinates (X2, Y2) represent a principal point position of the camera 81 when the boundary position (X, Y, Z) is connected to the camera 81.

The principal point position (X2, Y2) of the camera 81 can be obtained with reference to the horizontal coordinate of an image sensor, such as a charge-coupled device (CCD) or a Complementary Metal Oxide Semiconductor (CMOS) sensor, of the camera 81. The horizontal coordinate of the image sensor can be defined with reference to a horizontal width and a vertical width of the image sensor. For example, if the image sensor is a 640*480 sensor, the X coordinate in the horizontal direction takes a value ranging from 0 to 640, and the Y coordinate in the vertical direction takes a value ranging from 0 to 480.

Similarly, the principal point position (X1, Y1) of the projector 80 can be obtained with reference to the horizontal coordinate of a projected light sensor (e.g., CCD or CMOS). A distance L between the projector 80 and the camera 81 is a base-line length, which is determinable according to features and configuration of the apparatuses. The boundary position (X, Y, Z) of the object 82 can be obtained based on these parameters according to the triangulation principle. Further, it is feasible to measure the three-dimensional shape of the object 82 by obtaining the boundary position (X, Y, Z) along the entire surface of the object 82.

A shape of the stripe pattern light is described below.

FIGS. 9A to 9C illustrate examples of binary coded stripe pattern light, which are generally referred to as gray codes that are robust against coding errors. In each of FIGS. 9A, 9B, and 9C, the captured reflected pattern includes an area observed as a black area that corresponds to 0 and an area observed as a white area that corresponds to 1. The example of the stripe pattern light illustrated in FIG. 9A is composed of two areas, which are coded into 1 and 0 from the left side thereof.

The example of the stripe pattern light illustrated in FIG. 9B is composed of four areas, which are coded into 1, 0, 0, 1 as brighter and darker areas. When the corresponding stripe pattern light is irradiated, an image of its reflected pattern can be captured. Further, the example of the stripe pattern light illustrated in FIG. 9C is composed of eight areas, which are coded into 1, 0, 0, 1, 1, 0, 0, 1. When the corresponding stripe pattern light is irradiated, an image of its reflected pattern can be captured.

Hereinafter, the stripe pattern light illustrated in FIG. 9A to FIG. 9C are referred to as 1 bit stripe pattern light, 2 bit stripe pattern light, and 3 bit stripe pattern light, respectively. As described above, each area can be identified by allocating a coded area number to each area. According to the examples of stripe pattern light illustrated in FIGS. 9A to 9C, respective areas sequentially disposed from the left to the right can be defined as (1, 1, 1), (1, 1, 0), (1, 0, 0), (1, 0, 1), (0, 0, 1), (0, 0, 0), (0, 1, 0), and (0, 1, 1).

As described above, if three types of stripe pattern light are used, the space can be divided into eight sections. In this respect, the above-described example spatial coding is referred to as "3 bit spatial coding."

A further detailed shape measurement can be realized by projecting "n" types of the stripe pattern light that can be formed by successively reducing the brighter and darker areas, and allocating an area number to each of the "2n" divided areas of the irradiation area of the projector. Each area can be identified by the allocated area number. For example, 10 bit spatial coding is performed in the three-dimensional measurement for dividing the area into 1024 sections.

The above-described gray code is characterized in that, even when a coding error occurs at an area boundary due to deviation or blur of the stripe pattern light, the coding is not erroneously performed as a greatly deviated area although it may be determined as a neighboring area. Therefore, the spatial coding using gray code is a generally used method.

To improve the accuracy of the three-dimensional measurement according to the spatial coding method, it is necessary to determine a horizontal coordinate position X (hereinafter, referred to as "boundary position") of the boundary between a brighter area and a darker area based on captured image data.

Figure 10A:
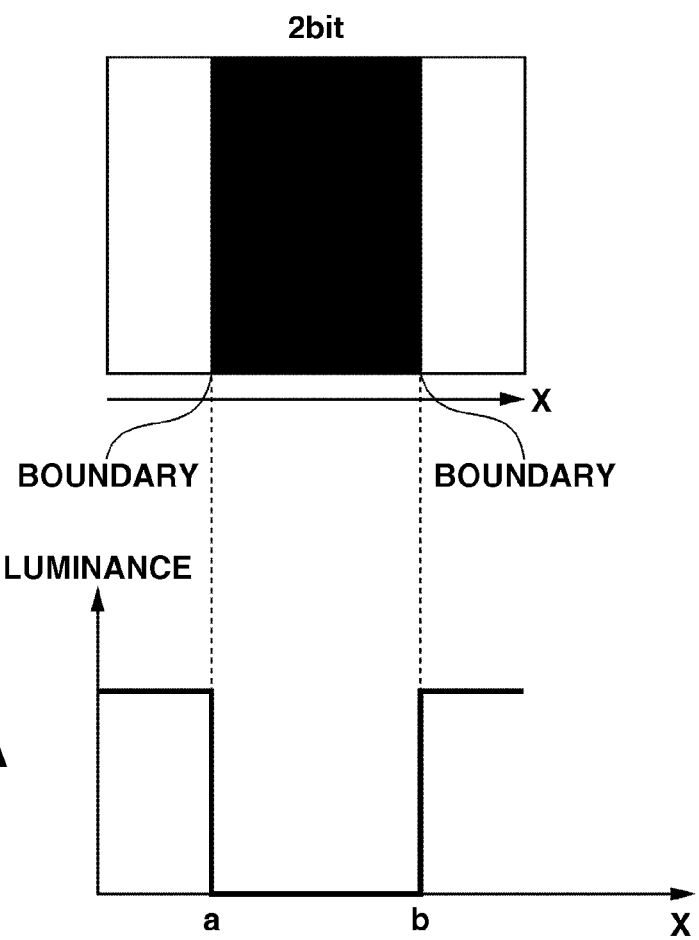
FIGS. 10A and 10B illustrate a gradient in luminance in the vicinity of a boundary position.
Figure 10B:
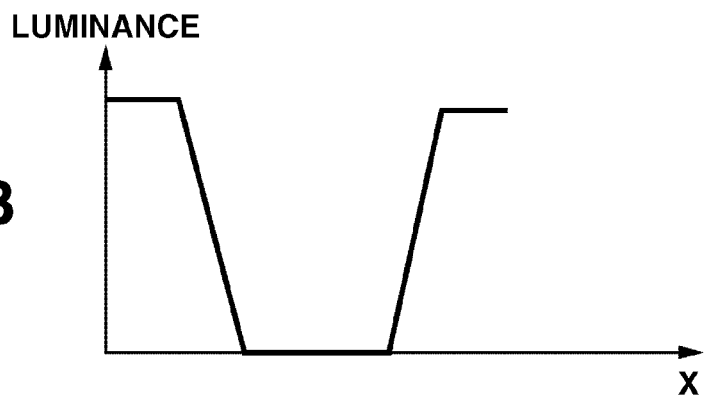
Figure 11A:
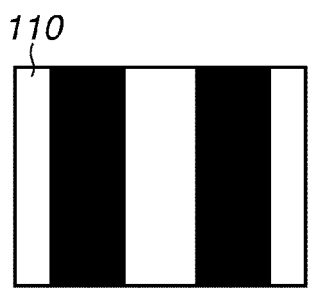
FIGS. 11A to 11D illustrate a conventional concept of generating corrected stripe pattern light.
Figure 11B:
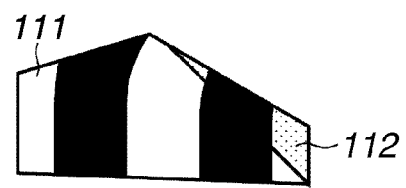
Figure 11C:
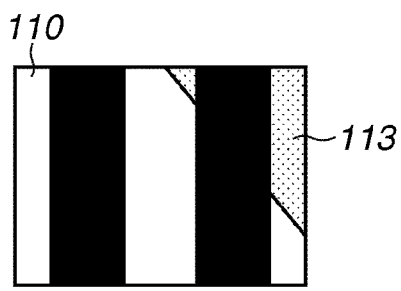
Figure 11D:
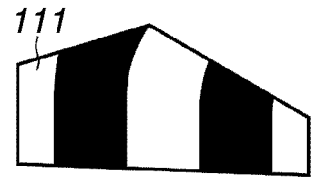

FIGS. 10A and 10B illustrate the luminance of image data obtained by capturing 2 bit stripe pattern light in relation to the horizontal coordinate position X. The example in FIG. 10A illustrates ideal boundary positions, according to which the brighter area and the darker area are mutually different in luminance value at each boundary. Therefore, the boundary positions between brighter and darker areas can be uniquely determined as a position "a" and a position "b". In practice, however, the boundary positions cannot be uniquely determined as the position "a" and the position "b". Instead, the boundary position has to be determined from non-uniquely defined positions, as shown in FIG. 10B.

Next, a three-dimensional measurement apparatus according to the present exemplary embodiment is described below.

Figure 1:
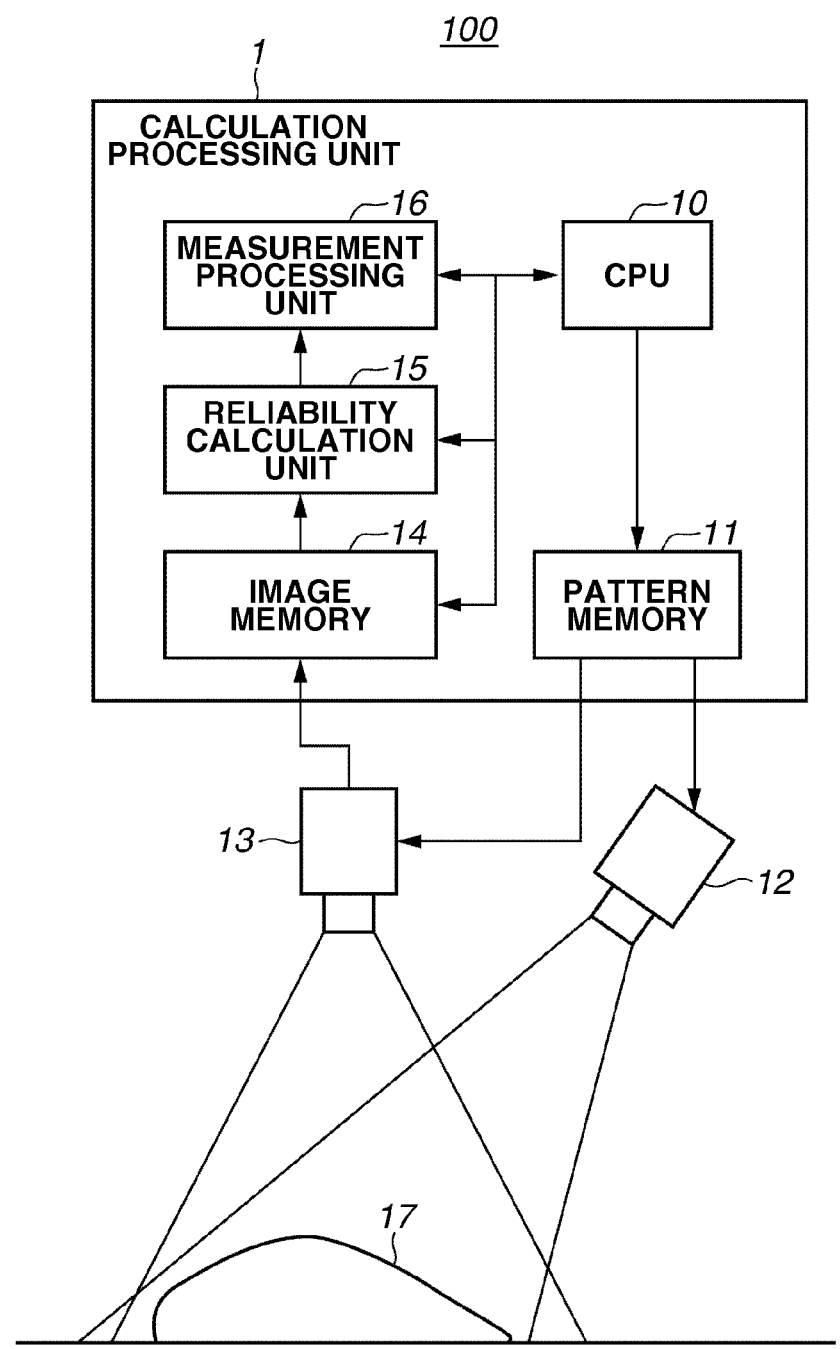
FIG. 1 is a block diagram illustrating a basic configuration of a three-dimensional measurement apparatus according to an exemplary embodiment of the present invention.

FIG. 1 is a block diagram illustrating a basic configuration of a three-dimensional measurement apparatus 100 according to the present exemplary embodiment.

In FIG. 1, the three-dimensional measurement apparatus 100 includes a projector 12 that can project stripe pattern light onto an object 17 and a camera 13 that can capture an image of the object 17 on which the stripe pattern light is projected. Further, the three-dimensional measurement apparatus 100 includes a calculation processing unit 1 that can issue instructions to the projector 12 to project stripe pattern light and to the camera 13 to capture an image of the object 17. Further, the calculation processing unit 1 can perform image processing and mathematical calculations on generated image data to realize the three-dimensional measurement.

The calculation processing unit 1 includes a central processing unit (CPU) 10, such as a microcontroller or data processor, a pattern memory 11, an image memory 14, a reliability calculation unit 15, and a measurement processing unit 16, which are mutually connected via a bus to transmit and receive signals. It is noted that the reliability calculation unit 15 and the measurement processing unit 16 may be implemented either as separate hardware circuits, separate software modules that can be executed by the CPU 10, or a combination of hardware circuits and software modules. The pattern memory 11 and image memory 14 can be constructed by one or more read only memory (ROM) modules. The pattern memory 11 is configured to store, for example, a pattern shape program for determining the shape of stripe pattern light and a time account program for setting projection time. If the pattern memory 11 receives a projection instruction from the CPU 10, the pattern memory 11 transmits a stripe-pattern-light shape signal to the projector 12.

In addition, the pattern memory 11 transmits a time account signal to each of the projector 12 and the camera 13 to manage the projection timing of the stripe pattern light and the capturing timing of a reflected pattern.

Image data generated from an image of the reflected pattern captured by the camera 13 can be temporarily stored in the image memory 14 and successively transmitted to the reliability calculation unit 15.

In the present embodiment, the reliability calculation unit 15 can be constructed by the ROM or a random access memory (RAM). The reliability calculation unit 15 can determine a boundary position between a brighter area and a darker area of the stripe pattern light and calculate a reliability of the boundary position. Further, the reliability calculation unit 15 can perform binarization processing on the image data to generate binary image data. If the Nbit spatial coding is performed, the stripe pattern light includes N types of pattern shapes. Therefore, a total of N pieces of binary image data can be generated by the reliability calculation unit 15. The reliability calculation unit 15 stores a program for performing the above-described processing. A boundary position determination method and a reliability calculation method are described below.

Further, the reliability calculation unit 15 transmits a calculated reliability result to the CPU 10. The CPU 10 determines whether to shift the stripe pattern light whose reliability is equal to or greater than a predetermined threshold value by a predetermined cycle based on the calculated reliability result. The content of the processing is described in detail below, for example, with reference to FIG. 5.

The binary image data generated by reliability calculation unit 15 is transmitted to the measurement processing unit 16. In the present embodiment, the measurement processing unit 16 can also be constructed by the ROM or the RAM. The measurement processing unit 16 stores device-dependent parameters, such as a base-line length, a focal length, and number of pixels of the projector 12 and the camera 13, as well as external parameters, such as distortion based on calibration performed beforehand, and luminance of external light. Further, the measurement processing unit 16 stores a three-dimensional measurement program based on the triangulation.

The measurement processing unit 16 can perform coding processing on binary image data and perform space modulation on the image data. Then, the measurement processing unit 16 obtains a correspondence relationship between a pixel of the projector 12 and a pixel of the camera 13 with reference to the coded data and performs three-dimensional measurement by the triangulation. The measurement processing unit 16 generates a measurement result as range image data (distance information) according to the number of pixels of the camera 13. The range image data is formed as an image by an output unit (not illustrated) and displayed as a range image by a display unit (not illustrated). All of the processing to be performed by the image memory 14, the reliability calculation unit 15, and the measurement processing unit 16 can be executed according to instructions from the CPU 10.

Next, a reliability calculation method is described below.

Figure 2A:
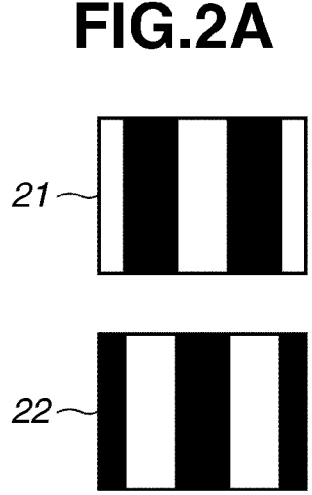
FIGS. 2A to 2C illustrate a reliability calculation method according to a first exemplary embodiment of the present invention.

FIG. 2A illustrates examples of stripe pattern light to be projected according to the present exemplary embodiment.

Stripe pattern light 21 illustrated in FIG. 2A is a spatial coded stripe pattern light, which is based on 3 bit gray code, and is hereinafter referred to as a "positive pattern." On the other hand, stripe pattern light 22 illustrated in FIG. 2A is stripe pattern light opposite to the stripe pattern light 21 in the arrangement of brighter areas and darker areas, and is hereinafter referred to as a "negative pattern." FIG. 2A illustrates examples of a positive pattern and a negative pattern of the 3 bit stripe pattern light. However, the actual measurement based on the spatial coding includes projecting a plurality of (e.g., 1 bit to 10 bit) stripe pattern light according to the resolution of the projector 12 and capturing an image of each projected stripe pattern light.

For example, if the 10 bit measurement is performed, it is necessary to capture a total of 20 pieces of images of the stripe pattern light.

Figure 2B:
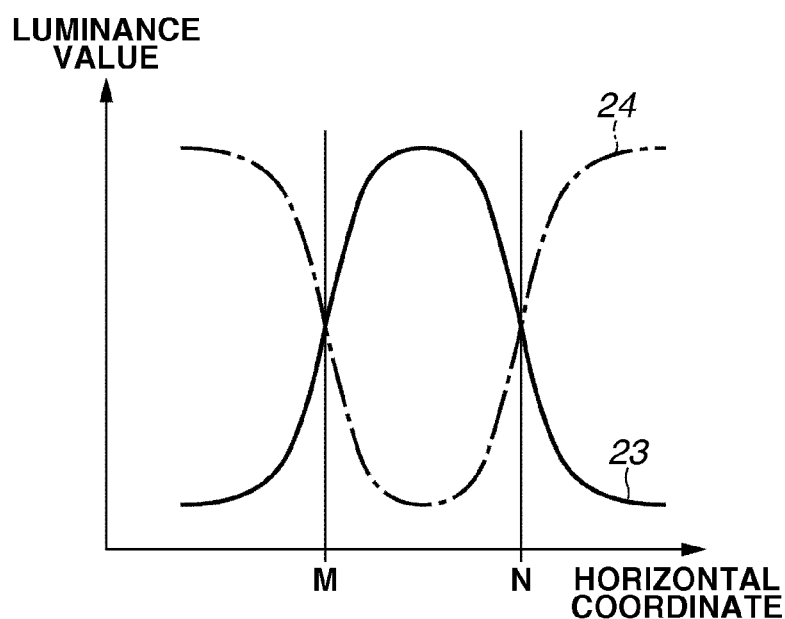

FIG. 2B illustrates a method for determining boundary positions and illustrates a relationship between luminance values of generated image data and the horizontal coordinate.

In FIG. 2B, a luminance line 23 represents the luminance line of the image data which is captured by projecting the stripe pattern light 21. On the other hand, a luminance line 24 represents the luminance line of the image data which is captured by projecting the stripe pattern light 22. A relative position in the horizontal pixel coordinate of the luminance line 24 is coincident with that of the luminance line 23. The luminance line 23 of the stripe pattern light 21 and the luminance line 24 of the stripe pattern light 22 intersect with each other at a position M and a position N. Therefore, the position M and the position N can be referred to as boundary positions.

Figure 2C:
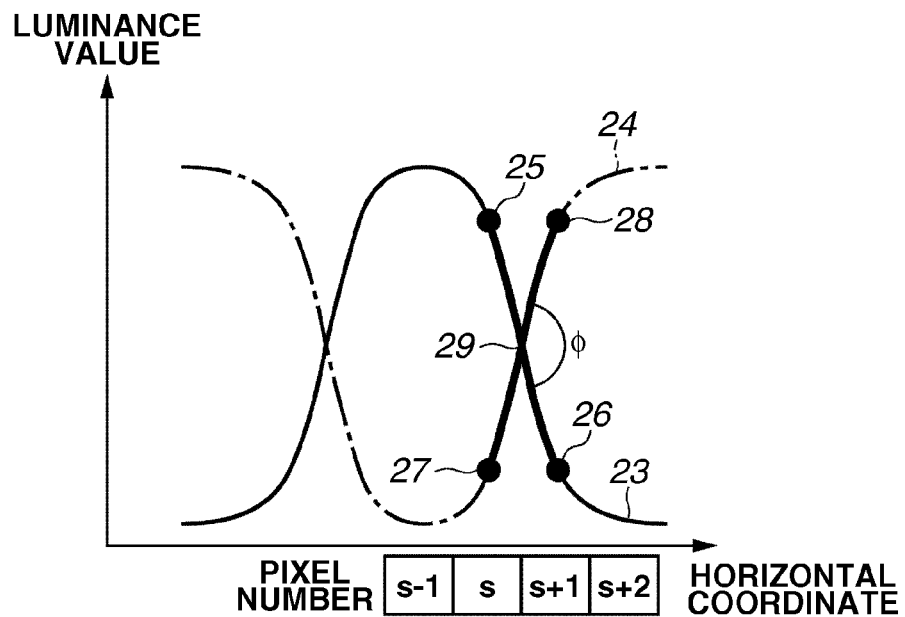

FIG. 2C illustrates an actual calculation method.

In FIG. 2C, a point 25 represents the luminance value of the s-th pixel and a point 26 represents the luminance value of the (s+1)-th pixel, in a case where the image data is captured by projecting the stripe pattern light 21 (a positive pattern). Further, a point 27 represents the luminance value of the s-th pixel and a point 28 represents the luminance value of the (s+1)-th pixel, in a case where the image data is captured by projecting the stripe pattern light 22 (a negative pattern). In the actual calculation method, a line segment connecting the point 25 and the point 26 and a line segment connecting the point 27 and the point 28 are drawn, and the horizontal coordinate of an intersection point 29 of two line segments is obtained. Then, the boundary position N can be calculated based on the horizontal coordinate of the intersection point 29. The reliability is defined by a gradient angle φ, which is an intersecting angle of the two straight lines.

If the projector can project an ideal rectangular wave under the ideal condition in which the reflectance of an object and the blur of an image are not taken into consideration, the angle φ is equal to 180 degrees as illustrated in FIG. 10A. However, the actual measurement is influenced by various factors, as discussed in the background section of this application, and the angle φ becomes smaller than 180 degrees. If the influences caused by deterioration conditions (e.g., blur and reflectance) become large, the angle φ becomes smaller than 180 degrees, as illustrated in FIG. 10B.

If a threshold value is set for the angle φ representing the reliability, it can be determined that the reliability of stripe pattern light is low if the angle φ is equal to or less than the threshold value. In this case, the distance measurement cannot be accurately performed even if the stripe pattern light is used in the three-dimensional measurement. For example, when the 10 bit measurement is performed, if only the reliability of the 10 bit stripe pattern light is less than the threshold value, it can be determined that the 1 bit to 9 bit measurements are accurate and the measurement density in the 1 bit to 9 bit measurements becomes smaller compared to that in the 10 bit measurement.

Even in such a case, the present exemplary embodiment can obtain a measurement density comparable to that in the 10 bit measurement. To this end, the present exemplary embodiment shifts the 9 bit stripe pattern light, i.e., the stripe pattern light having the largest bit number among the stripe pattern light whose reliability is equal to or greater than the threshold value, by a predetermined cycle according to the following method, and performs an additional image capturing operation using the shifted stripe pattern light.

A method for shifting the stripe pattern light to improve the measurement density is described below.

FIG. 3 illustrates shapes of the 8 bit stripe pattern light, the 9 bit stripe pattern light, and the 10 bit stripe pattern light, together with shapes of shifted 9 bit stripe pattern light. In FIG. 3, each stripe pattern light is represented by a rectangular waveform, where the magnitude in the vertical direction represents the luminance value (0 or 1). Each convex portion of the stripe pattern shape (low value of the rectangular waveform) is a brighter area and each concave portion of the stripe pattern shape (high value of the rectangular waveform) is a darker area. Further, pixel numbers are disposed sequentially in the horizontal direction.

As illustrated in FIG. 3, one cycle of the 8 bit stripe pattern light is comparable to (occupies) 16 pixels. The cycle of the 9 bit stripe pattern light is comparable to 8 pixels. The cycle of the 10 bit stripe pattern light is comparable to 4 pixels. 9 bit−stripe pattern light (negatively shifted 9 bit stripe pattern light) is obtained when the 9 bit stripe pattern light is shifted by an amount corresponding to ⅛ cycle toward the negative direction with respect to the pixel number. 9 bit+stripe pattern light (positively shifted 9 bit stripe pattern light) is obtained when the 9 bit stripe pattern light is shifted by an amount corresponding to ⅛ cycle toward the positive direction with respect to the pixel number. FIG. 3 illustrates, at a middle part thereof, boundary positions obtainable by the 8 bit, 9 bit, and 10 bit stripe pattern light.

When analyzing FIG. 3 from left to right, it can be observed that the first boundary position of the 10 bit stripe pattern light coincides with the first boundary position of the 9 bit+stripe pattern light. The second boundary position of the 10 bit stripe pattern light coincides with the first boundary position of the 9 bit−stripe pattern light. As described above, each boundary position of the 10 bit stripe pattern light alternately coincides with a boundary position of the 9 bit+stripe pattern light or a boundary position of the 9 bit−stripe pattern light.

As evidenced from the foregoing description, the bit stripe pattern light can be compensated by using the 9 bit+stripe pattern light and the 9 bit−stripe pattern light.

Specifically, in the 10 bit measurement, if the 10 bit stripe pattern light is insufficient in reliability and only the 1 bit to 9 bit measurements are reliable, images of the 9 bit+stripe pattern light and the 9 bit−stripe pattern light are additionally captured. Accordingly, a measurement density comparable to that of the 10 bit measurement can be obtained based on the additionally captured images.

Figure 4:
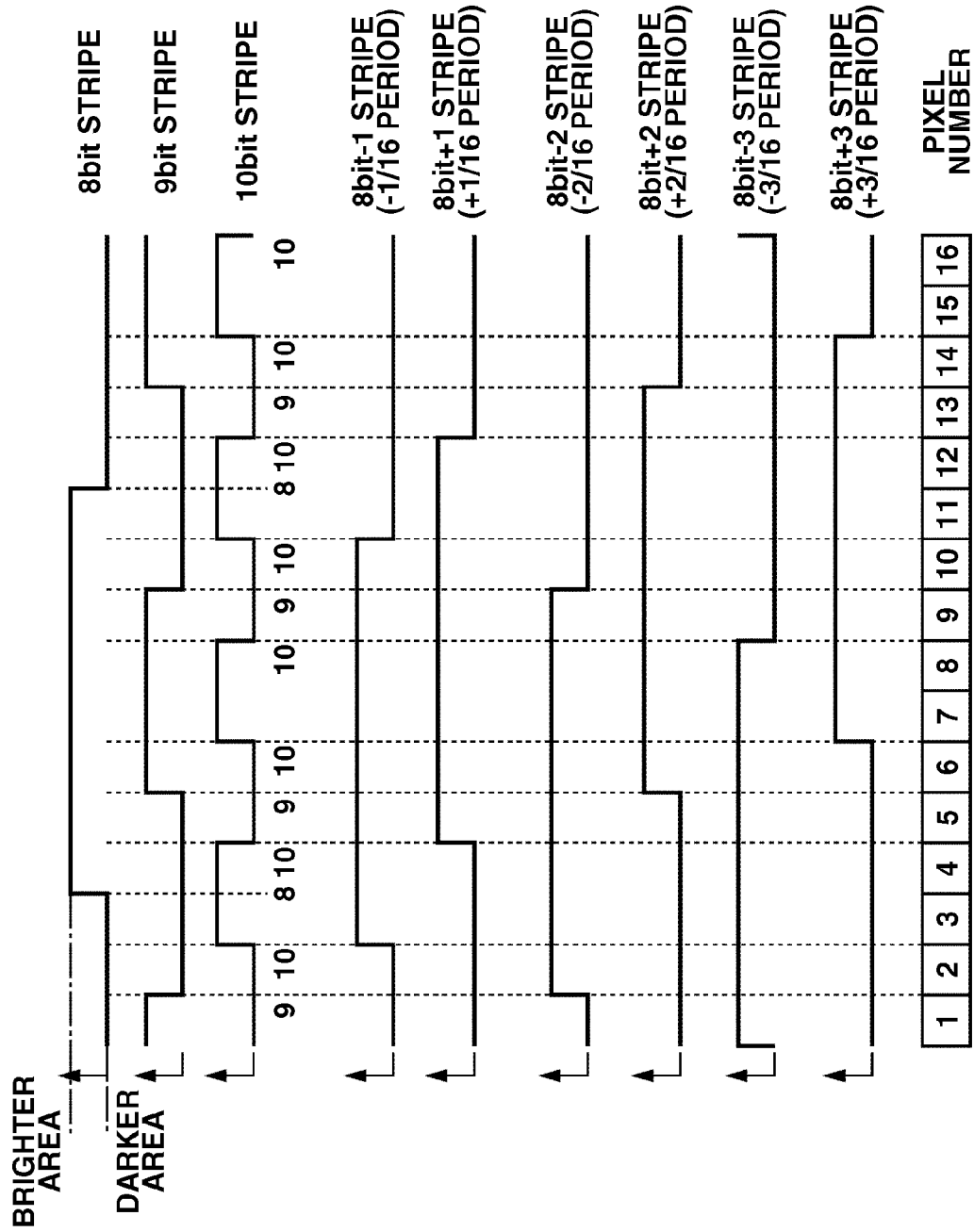
FIG. 4 illustrates boundary positions when stripe pattern light is shifted.

FIG. 4 illustrates an example shifting of the 8 bit stripe pattern light.

In FIG. 4, 8 bit−1 stripe pattern light, 8 bit−2 stripe pattern light, and 8 bit−3 stripe pattern light are obtained when the 8 bit stripe pattern light is shifted by an amount corresponding to 1/16 cycle, 2/16 cycle, and 3/16 cycle, respectively, toward the negative direction. Further, 8 bit+1 stripe pattern light, 8 bit+2 stripe pattern light, and 8 bit+3 stripe pattern light are obtained when the 8 bit stripe pattern light is shifted by the amount corresponding to 1/16 cycle, 2/16 cycle, and 3/16 cycle, respectively, toward the positive direction.

As illustrated in FIG. 4, the first boundary position of the 10 bit stripe pattern light coincides with the first boundary position of the 8 bit-1 stripe pattern light. The second boundary position of the 10 bit stripe pattern light coincides with the first boundary position of the 8 bit+1 stripe pattern light. The third boundary position of the 10 bit stripe pattern light coincides with the first boundary position of the 8 bit+3 stripe pattern light. Similarly, the fourth boundary position of the 10 bit stripe pattern light coincides with the second boundary position of the 8 bit-3 stripe pattern light. The fifth boundary position of the 10 bit stripe pattern light coincides with the second boundary position of the 8 bit-1 stripe pattern light.

As described above, the 10 bit stripe pattern light can be compensated by using four stripe pattern light, i.e., the 8 bit−1 stripe pattern light, the 8 bit+1 stripe pattern light, the 8 bit−3 stripe pattern light, and the 8 bit+3 stripe pattern light. Similarly, as illustrated in FIG. 4, the 9 bit stripe pattern light can be compensated by using two stripe pattern light, i.e., the 8 bit−2 stripe pattern light and the 8 bit+2 stripe pattern light.

As described above, the lower bit stripe pattern light can be compensated by shifting the upper bit stripe pattern light. The following formula (1) can be used to calculate a shift amount of an Mbit stripe pattern light required to compensate an Lbit stripe pattern light.

$$\text{Shift amount}=\pm k/2(L-M+2) \quad \text{formula (1)}$$

In the formula (1), k=1 to 2L−M−1, and L>M

Next, an example processing procedure of the three-dimensional measurement according to the present exemplary embodiment is described below.

Figure 5:
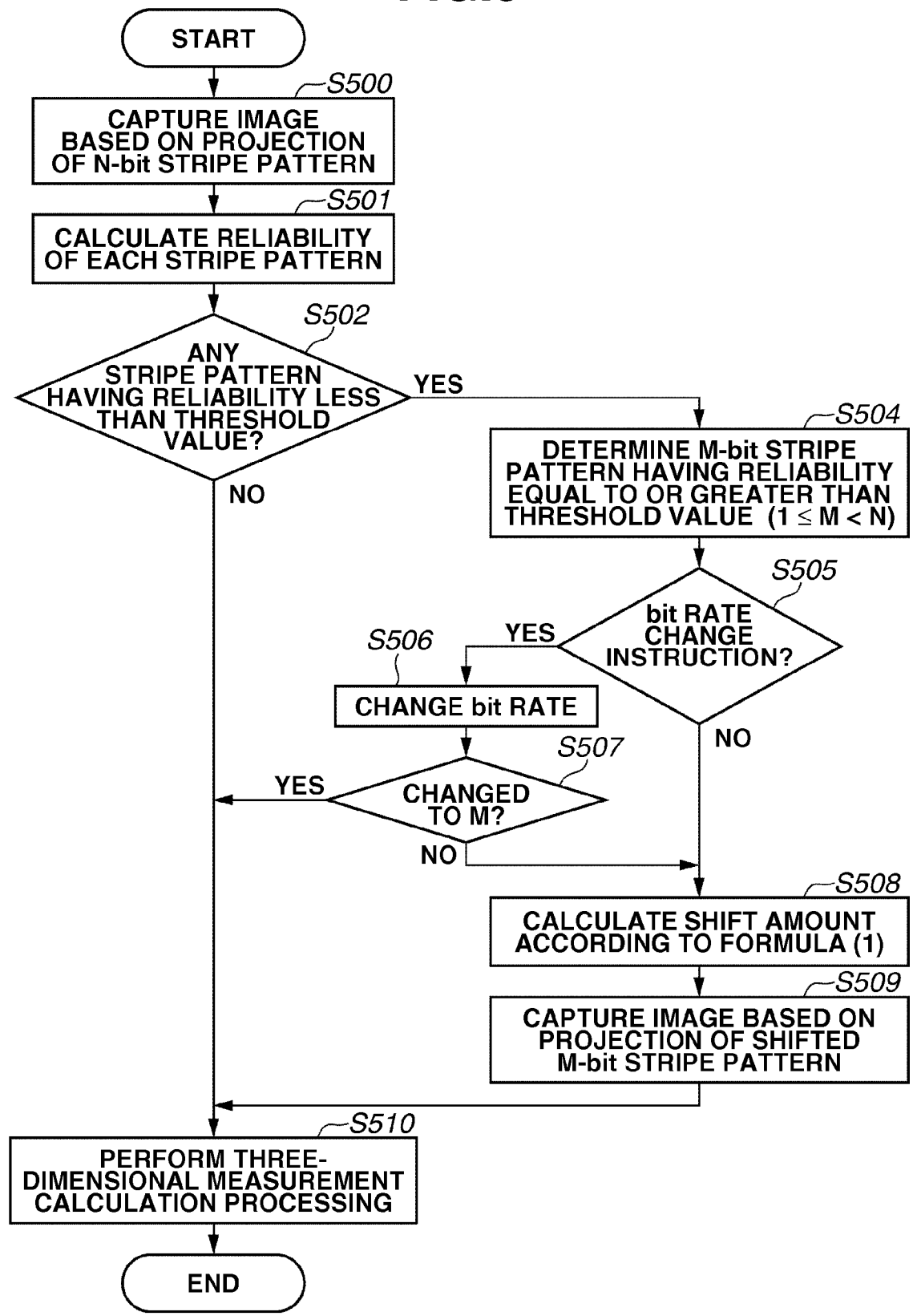
FIG. 5 is a flowchart illustrating an example procedure of three-dimensional measurement processing.

FIG. 5 is a flowchart illustrating the procedure of the three-dimensional measurement according to the present exemplary embodiment. The CPU 10 of the calculation processing unit 1 can perform each processing illustrated in FIG. 5.

First, in step S500, in order to perform a predetermined Nbit measurement, the projector 12 projects the positive pattern and the negative pattern of the 1 bit to Nbit stripe pattern light and the camera 13 successively captures images of the projected patterns. In this case, the camera 13 can capture 2*N pieces of image data. The captured image data is stored in the image memory 14.

In step S501, the reliability calculation unit 15 calculates a reliability of each bit based on the positive pattern and the negative pattern according to the procedure illustrated in FIGS. 2A and 2C.

Then, in step S502, the calculation processing unit 1 determines whether stripe pattern light whose reliability is less than a threshold value is present. If it is determined that the stripe pattern light whose reliability is less than the threshold value is not present (NO in step S502), the calculation processing unit 1 can determine that the measurement can be performed with sufficient accuracy. That is, if it is determined that the stripe pattern light captured by the camera 13 has a reliability equal to or above the threshold value, the measurement can be performed with sufficient accuracy. Therefore, the processing proceeds to step S510. In step S510, the measurement processing unit 16 performs three-dimensional measurement calculation processing by performing binarization processing on the captured image data and, as a result, generates a range image.

On the other hand, if it is determined that stripe pattern light whose reliability is less than the threshold value is present (YES in step S502), the process advances to step S504. In step S504, the reliability calculation unit 15 determines which stripe pattern light can be made to have reliability is equal to or greater than the threshold value. In the present exemplary embodiment, it is presumed that M (1≤M<N) bit stripe pattern light is stripe pattern light having the largest bit number among the stripe pattern light whose reliability is equal to or greater than the threshold value. More specifically, the Mbit stripe pattern light is a minimum stripe pattern light that can assure satisfactory measurement when the measurement deterioration factors are taken into consideration.

Hence, performing the measurement using the shifted Mbit stripe pattern light is useful to obtain a measurement density comparable to that in the measurement using the Nbit stripe pattern light. Further, information about the Mbit is displayed on a display unit (not illustrated) to notify a measurement operator that the Mbit is usable as the maximum bit stripe pattern light.

Next, in step S505, the measurement processing unit 16 determines whether a bit rate change instruction has been received from the measurement operator to attain a desired measurement density.

For example, although it was initially intended to attain the Nbit measurement density, the measurement may be substantially restricted to the Mbit due to the influence of deterioration. In such a case, the measurement operator can determine whether to continue the measurement up to the Nbit or stop the measurement at the Xbit, in which X is smaller than N (M≤X<N). Thus, the measurement processing unit 16 determines whether the bit rate change instruction has been received from the measurement operator via an operation unit (not illustrated) to perform the measurement up to the Xbit.

If it is determined that the bit rate change instruction has been received (YES in step S505), then in step S506, the measurement processing unit 16 changes a maximum bit rate for the measurement from the value N to a smaller value X.

Then, in step S507, the calculation processing unit 1 determines whether the bit rate X coincides with the bit rate M. If it is determined that the bit rate X coincides with the bit rate M (YES in step S507), it is unnecessary to shift the stripe pattern light. Therefore, the processing proceeds to step S510. On the other hand, if it is determined that the bit rate X is greater than the bit rate M (NO in step S507), the processing proceeds to step S508.

Referring back to step S505, if it is determined that the bit rate change instruction has not been received (NO in step S505), the process advances to step S508. In step S508, the measurement processing unit 16 calculates a shift amount for each of (M+1) bit to N (or X) bit stripe pattern light according to the above-described formula (1).

Next, in step S509, shape signals of respective types of the stripe pattern light each having the calculated shift amount are stored in the pattern memory 11. The projector 12 projects these types of stripe pattern light and the camera 13 successively captures images of the projected stripe pattern light. Next, in step S510, the measurement processing unit 16 performs binarization processing on the image data captured in step S509. The measurement processing unit 16 performs the three-dimensional measurement calculation processing using the obtained binary image data and the 1 bit to Mbit binary image data. Then, the measurement processing unit 16 finally generates an N (or X) bit range image.

As described above, even in a case where the measurement cannot be performed up to the predetermined Nbit, the three-dimensional measurement apparatus 100 according to the present exemplary embodiment determines stripe pattern light having measurable intervals based on the reliability thereof and shifts the determined stripe pattern light by an amount calculated by the above-described formula (1). As a result, it becomes feasible to attain the measurement density requested by a user.

Further, when the stripe pattern light is shifted as described above in the present exemplary embodiment, an appropriate measurement can be realized while taking a status of measurement into consideration. Although the number of stripe pattern light to be projected becomes larger compared to that in conventional spatial coding methods, the present technique is considered advantageous because it is more robust and reliable than conventionally known techniques. More specifically, according to the present exemplary embodiment, if each of the stripe pattern light has a reliability that is equal to or greater than the threshold value, the ordinary spatial coding method is performed. On the other hand, if any one of the stripe pattern light has a reliability that is less than the threshold value, the measurement operator can set an arbitrary measurement density to perform the measurement. Thus, the present exemplary embodiment enables the measurement operator to perform the measurement with higher degrees of freedom and with more confidence in accuracy.

<Second Embodiment>

In the first exemplary embodiment, the positive pattern and the negative pattern are used to calculate the reliability of the stripe pattern light. A second exemplary embodiment is substantially similar to the first embodiment in terms of apparatus structure and processing method, but it is different from the first exemplary embodiment in that the reliability used in the spatial coding method is calculated without using a combination of the positive pattern and the negative pattern. A basic configuration of the three-dimensional measurement apparatus 100 according to the present exemplary embodiment is similar to that described in the first exemplary embodiment. Therefore, the description thereof is not repeated. Further, a processing procedure of the three-dimensional measurement is similar to that described with reference to the flowchart illustrated in FIG. 5 and, therefore, the description thereof is not repeated.

Figure 6A:
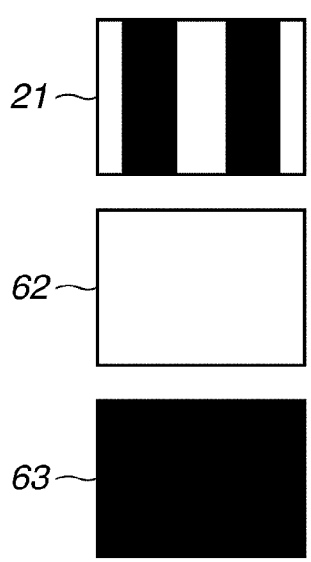
FIGS. 6A to 6C illustrate a reliability calculation method according to a second exemplary embodiment of the present invention.

FIG. 6A illustrates examples of stripe pattern light to be projected according to the second exemplary embodiment. Stripe pattern light 21 illustrated in FIG. 6A is a spatial coded stripe pattern light based on the 3 bit gray code, as described in reference to FIG. 2A of the first embodiment. A complete illuminated pattern 62 is a pattern including only the brighter area. A complete non-illuminated pattern 63 is a pattern including only the darker area. In the present exemplary embodiment, the three-dimensional measurement apparatus 100 performs the 3 bit spatial coding using the 1 bit to 3 bit stripe pattern light, the complete illuminated pattern 62 including only the brighter area, and the complete non-illuminated pattern 63 including only the darker area.

Figure 6B:
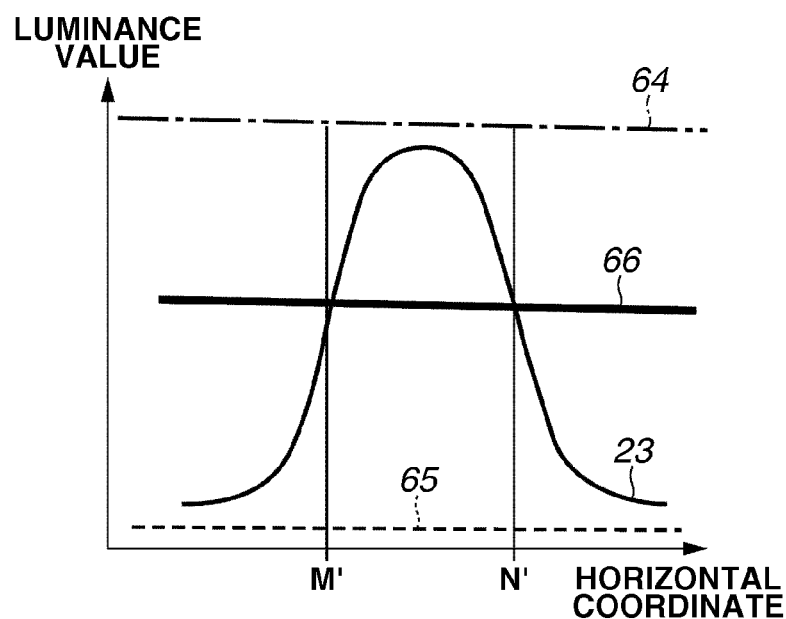

A method for determining boundary positions of the stripe pattern light 21 is described below with reference to FIG. 6B. FIG. 6B illustrates a relationship between luminance values of generated image data and the horizontal coordinate.

In FIG. 6B, the luminance line 23 represents the luminance line of the image data which is captured by projecting the stripe pattern light 21. On the other hand, a luminance line 64 represents the luminance line of image data which is captured by projecting the complete illuminated pattern 62. A luminance line 65 represents the luminance line of image data which is captured by projecting the complete non-illuminated pattern 63. Further, a luminance line 66 represents an average value of two luminance lines 64 and 65. The luminance line 23 of the stripe pattern light 21 intersects with the average luminance line 66 at a position M' and a position N'. Therefore, the position M' and the position N' can be referred to as boundary positions.

Figure 6C:
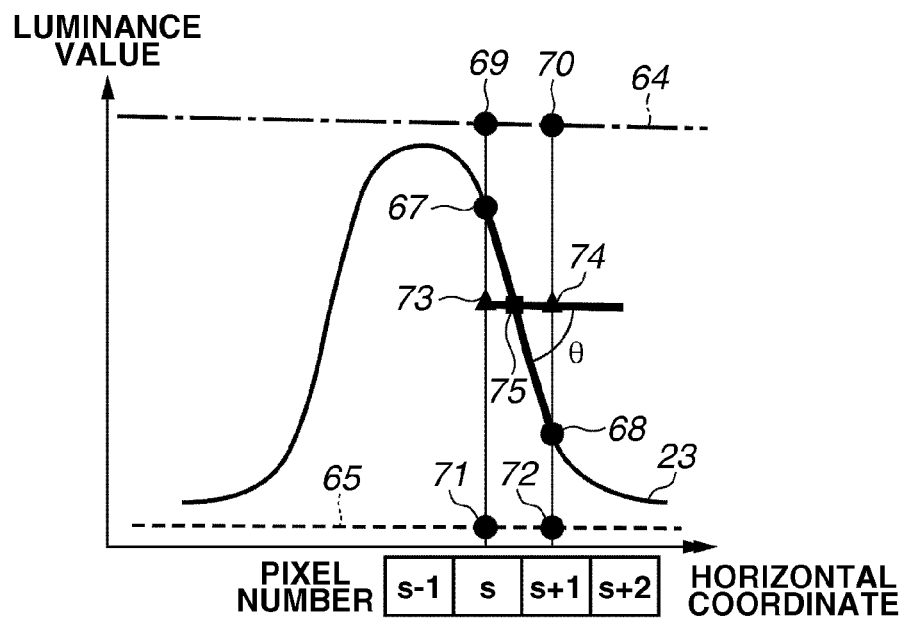

FIG. 6C illustrates an actual calculation method.

In FIG. 6C, a point 67 represents the luminance value of the s-th pixel and a point 68 represents the luminance value of the (s+1)-th pixel, in a case where the image data is captured by projecting the stripe pattern light 21. A point 69 represents the luminance value of the s-th pixel and a point 70 represents the luminance value of the (s+1)-th pixel, in a case where the image data is captured by projecting the complete illuminated pattern 62. A point 71 represents the luminance value of the s-th pixel and a point 72 represents the luminance value of the (s+1)-th pixel, in a case where the image data is captured by projecting the complete non-illuminated pattern 63.

When an average value of the pixels corresponding to the image data pieces captured by projecting the complete illuminated pattern 62 and by projecting the complete non-illuminated pattern 63 is calculated, a point 73 represents the average value of the point 69 and the point 71 that correspond to the s-th pixel. A point 74 represents the average value of the point 70 and the point 72 that correspond to the (s+1)-th pixel. Then, a line segment connecting the point 67 and the point 68 and a line segment connecting the point 73 and the point 74 are drawn, and the horizontal coordinate of an intersection point 75 of two line segments is obtained. Then, the boundary position N' can be calculated based on the horizontal coordinate of the intersection point 75. The reliability is defined by an angle θ, which is an intersecting angle of the two straight lines.

As described above, the three-dimensional measurement apparatus 100 according to the present exemplary embodiment can obtain a reliability comparable to that described in the first exemplary embodiment without using both the positive pattern and the negative pattern. The spatial coding method that does not use both the positive pattern and the negative pattern is effective in speedily accomplishing the measurement with high reliability, because the number of required images can be reduced to a half level compared to the spatial coding method using both the positive pattern and the negative pattern.

<Third Embodiment>

An example reliability calculation method according to a third exemplary embodiment, which is different from those described in the first and second exemplary embodiments, is described below. A basic configuration of the three-dimensional measurement apparatus 100 according to the third exemplary embodiment is similar to that described in the first exemplary embodiment. Therefore, the description thereof is not repeated. Further, a processing procedure of the three-dimensional measurement is similar to that described with reference to the flowchart illustrated in FIG. 5 and, therefore, the description thereof is not repeated.

Figure 7:
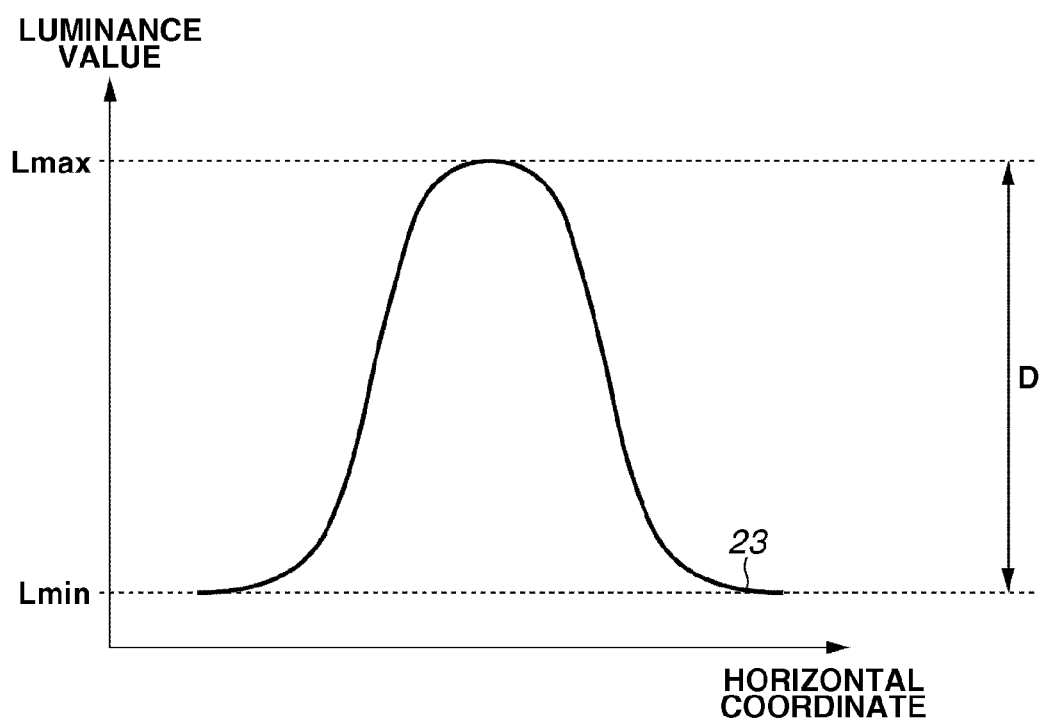
FIG. 7 illustrates a reliability calculation method according to a third exemplary embodiment of the present invention.

FIG. 7 illustrates the luminance value of image data generated in the third exemplary embodiment in relation to the horizontal coordinate X.

In FIG. 7, Lmax and Lmin represent an upper limit value and a lower limit value, respectively, with respect to the luminance value of the stripe pattern light. According to the present exemplary embodiment, a luminance difference D (=Lmax−Lmin), which represents a difference between the upper limit value and the lower limit value is calculated and defined as reliability. Alternatively, instead of using the luminance difference D, a contrast ratio can be defined as the reliability. The contrast ratio can be calculated according to the following formula (2).

$$C = (Lmax - Lmin)/(Lmax + Lmin) \quad \text{formula (2)}$$

As described above, the three-dimensional measurement apparatus 100 according to the present exemplary embodiment can perform the calculation based on the upper limit value and the lower limit value with respect to the luminance value of image data. As described above, a general concept, such as the contrast ratio, can be used to define the reliability.

<Fourth Embodiment>

The present invention can be effective in the blur of stripe pattern light due to a material of an object. If the material of the object is a translucent material, a porous material, or the like, projected stripe pattern light causes internal scattering near the surface and may be blurred. If such a phenomenon occurs, the distance measurement can be performed with a desired measurement density by shifting the stripe pattern light with high reliability using the reliability described in the first to third exemplary embodiments.

Aspects of the present invention, in particular the flow process of FIG. 5, can also be realized by a computer of a system or apparatus (or devices such as a CPU or a micro processing unit (MPU)) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable media, including optical or magnetic recording media, such as a compact disc (CD), a digital versatile disk (DVD), an electrically erasable programmable read-only memory (EEPROM), or the like).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-229531 filed Oct. 12, 2010, which is hereby incorporated by reference herein in its entirety.

What is claimed is:

1. A three-dimensional measurement apparatus, comprising:
a projection unit configured to project a plurality of stripe patterns on an object, each stripe pattern including bright and dark areas alternately disposed at a different cycle from one stripe pattern to another;
an imaging unit configured to capture a plurality of stripe pattern reflected lights reflected from the object on which the plurality of stripe patterns is projected by the projection unit;
a calculation unit configured to calculate reliability for the plurality of stripe pattern reflected lights; and
an acquisition unit configured to acquire distance information of the object from the plurality of stripe pattern reflected lights captured by the imaging unit,
wherein, when the calculated reliability is less than a threshold value for any of the reflected lights in the plurality of stripe pattern reflected lights, the projection unit is configured to project a shifted stripe pattern on the object, the shifted stripe pattern is generated by shifting by a predetermined cycle a stripe pattern corresponding to a reflected light whose reliability calculated by the calculation unit is equal to or greater than the threshold value,
wherein the imaging unit is configured to capture reflected light of each shifted stripe pattern projected on the object, and
wherein the acquisition unit is configured to acquire distance information of the object based on the captured reflected light that corresponds to the shifted stripe pattern.

2. The three-dimensional measurement apparatus according to claim 1, wherein the calculation unit is configured to calculate the reliability based on a gradient in luminance value at a boundary position where the bright and dark areas are inverted.

3. The three-dimensional measurement apparatus according to claim 1, wherein the calculation unit is configured to calculate luminance values of the bright and dark areas, and calculate the reliability based on a difference between an upper limit value and a lower limit value of the calculated luminance value or based on a contrast ratio thereof.

4. The three-dimensional measurement apparatus according to claim 1, wherein the acquisition unit is configured to use distance information of the object that corresponds to the shifted stripe pattern as distance information that corresponds to stripe pattern light whose reliability is less than the threshold value.

5. The three-dimensional measurement apparatus according to claim 1, wherein the predetermined cycle is defined by a value $\pm k/2(L-M+2)$ ($k=1$ to $2L-M-1$) when L represents a bit number of each stripe pattern required in the measurement, and M represents a bit number of a stripe pattern that is largest among the stripe patterns whose reliability is equal to or greater than the threshold value.

6. A method for three-dimensional measurement, the method comprising:
projecting a plurality of stripe patterns on an object, each stripe pattern including bright and dark areas alternately disposed at a different cycle from one stripe pattern to another;
capturing a plurality of stripe pattern reflected lights reflected from the object on which the plurality of stripe patterns is projected;
calculating reliability for the plurality of stripe pattern reflected lights;
acquiring distance information of the object from the plurality of stripe pattern reflected lights captured by the capturing;
when the calculated reliability is less than a threshold value for any of the reflected lights in the plurality of stripe pattern reflected lights, projecting a shifted stripe pattern on the object, the shifted stripe pattern is generated by shifting by a predetermined cycle a stripe pattern corresponding to a reflected light whose reliability calculated by the calculation unit is equal to or greater than the threshold value;
capturing reflected light of each shifted stripe pattern projected on the object; and
acquiring distance information of the object based on the captured reflected light that corresponds to the shifted stripe pattern.

7. A non-transitory computer-readable storage medium storing a program for causing a computer to execute steps of:
projecting a plurality of stripe patterns on an object, each stripe pattern including bright and dark areas alternately disposed at a different cycle from one stripe pattern to another;
capturing a plurality of stripe pattern reflected lights reflected from the object on which the plurality of stripe patterns is projected;
calculating reliability for the plurality of stripe pattern reflected lights;
acquiring distance information of the object from the plurality of stripe pattern reflected lights captured by the capturing;
when the calculated reliability is less than a threshold value for any of the reflected lights in the plurality of stripe pattern reflected lights, projecting a shifted stripe pattern on the object, the shifted stripe pattern is generated by shifting by a predetermined cycle a stripe pattern corresponding to a reflected light whose reliability calculated by the calculating is equal to or greater than the threshold value;
capturing reflected light of each shifted stripe pattern projected on the object; and
acquiring distance information of the object based on the captured reflected light that corresponds to the shifted stripe pattern.

8. A three-dimensional measurement apparatus, comprising:
- a projection unit configured to project onto an object a plurality of stripe patterns, each stripe pattern including bright and dark areas alternately disposed at a different cycle from one stripe pattern to another;
- an imaging unit configured to capture reflected light from the object on which the plurality of stripe patterns is projected by the projection unit, the reflected light having a plurality of reflected patterns corresponding to the plurality of stripe patterns incident on the object;
- a calculation unit configured to calculate reliability of the plurality of reflected patterns; and
- an acquisition unit configured to acquire distance information of the object based the plurality of reflected patterns;
- wherein, when the reliability of any of the plurality of reflected patters patterns calculated by the calculation unit is less than a threshold value, the projection unit projects onto the object a shifted stripe pattern, the shifted stripe pattern is generated by shifting by a predetermined cycle a stripe pattern corresponding to a reflected pattern whose reliability calculated by the calculation unit is equal to or greater than the threshold value,
- wherein the imaging unit captures reflected light of the shifted stripe pattern projected on the object, and
- wherein the calculation unit calculates a distance of the object that corresponds to the shifted stripe pattern.

* * * * *